Aug. 5, 1924.
C. S. MUMMERY
1,503,993
INERT ELECTRIC BATTERY
Filed Nov. 16, 1921
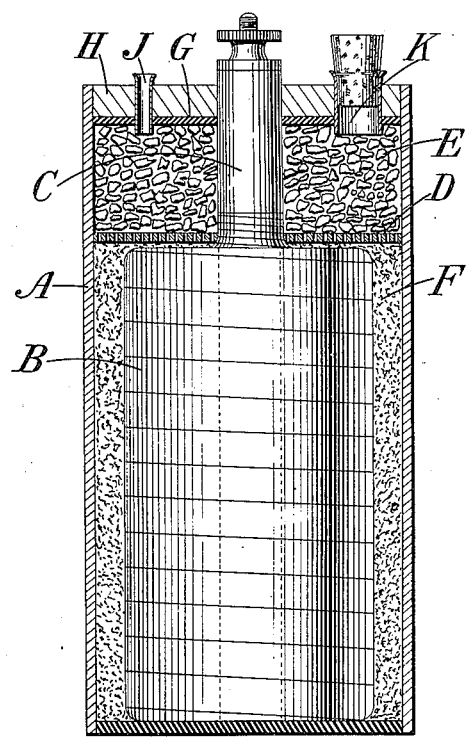
Inventor
Charles S. Mummery
by Aymes Hobbins Burgess & Parmelee
his attorneys Patented Aug. 5, 1924.

1,503,993

UNITED STATES PATENT OFFICE.

CHARLES SAMUEL MUMMERY, OF LONDON, ENGLAND, ASSIGNOR TO THE EVER READY COMPANY (GREAT BRITAIN) LIMITED, OF LONDON, ENGLAND, A BRITISH COMPANY.

INERT ELECTRIC BATTERY.

Application filed November 16, 1921. Serial No. 515,519.

*To all whom it may concern:*

Be it known that I, CHARLES SAMUEL MUMMERY, a subject of the King of England, residing at London, England, have invented certain new and useful Improvements in Inert Electric Batteries, of which the following is a specification.

This invention is for improvements in or relating to inert electric-batteries and has for its object to provide a dry battery which shall not be liable to degeneration through such moisture as may have access to the battery during storage in normal conditions.

As is well known, these batteries are usually made up with a zinc container in which is a carbon element surrounded by a depolarizing agent enclosed in a canvas wrapping, the carbon and depolarizing agent attached thereto being together known as the "dolly." The space between the dolly and the zinc container is packed with an electrolyte in dry form, for instance, ammonium chloride, together with an inert absorbent substance such as gum tragacanth, which ingredients are introduced in a dry state.

So long as such a battery can be kept really dry it does not appreciably degenerate, but it sometimes happens that a certain amount of moisture obtains access to the ingredients between the dolly and the zinc container whereby electrolytic action is set up and consequent degeneration of the battery takes place, whereas the battery should not be rendered active until water is poured into it.

A further object of the present invention is to provide that the cell shall acquire its maximum degree of activity as quickly as possible after water is added to the dry electrolyte.

According to this invention, the dry electrolyte is placed in a part of the battery where it is separated from the absorbent material by a diaphragm, through which water can percolate (for example in an auxiliary chamber) but so arranged that when water is poured into the battery the electrolyte will be dissolved and the resulting solution caused to penetrate the absorbent material.

The accompanying drawing is a vertical central section through a battery constructed according to one method of carrying out this invention.

The usual container A is employed and in this is mounted a dolly B which may comprise a carbon rod C whose lower portion is surrounded with a depolarizing agent secured to it by an exterior wrapping of paper or other suitable material.

Above the dolly proper is a perforated partition D so that an auxiliary chamber E is thereby provided in the upper portion of the container. The space F is filled with absorbent material in a dry condition as heretofore, but the dry component of the electrolyte is placed in dry form in the auxiliary chamber E. Above this is a diaphragm of cork G, or of any convenient material, to receive the filling in of wax H with which these batteries are usually sealed. A vent-tube J and a filling-tube K are provided in the top of the battery and extend through to the auxiliary chamber E. It thus follows that when water is poured into the filling-tube K the electrolyte will be dissolved and will be carried by the water into the absorbent material filling the space F. Air escapes by the vent-tube J during filling in the usual way. When the battery has been satisfactorily filled any surplus water is tipped out and it is then ready for service.

To prevent the dry electrolyte from setting up action between the carbon rod C and the zinc container whilst in the auxiliary chamber E, these may be painted with some insulating varnish, or the rod may be surrounded by a sleeve of insulating material, such as a sleeve of rubber or vulcanite.

Obviously, the auxiliary chamber E may be placed in other positions, for example it can be situated at the bottom of the cell, and the means for filling would then be provided at the bottom.

The diaphragm G may be omitted, if desired, and the separating diaphragm D may be either of perforated or absorbent material.

I claim:—

1. An electric battery of the inert type provided with an auxiliary chamber for all of the dry component for the electrolyte, said chamber being adapted to have liquid filled thereinto and having one wall which completely partitions off the chamber from the main interior of the battery and is formed of material that permits water filled into the auxiliary chamber to percolate through it into the main interior of the battery, said main interior being free from electrolyte before the battery is brought into use.

2. An electric battery of the inert type provided in the upper part thereof with an auxiliary chamber for all of the dry components for the electrolyte, said chamber being adapted to have liquid filled thereinto, and having a bottom which completely partitions off the auxiliary chamber from the main interior of the battery and is formed of material that permits water filled into the auxiliary chamber to percolate through it into the main interior of the battery, which latter is free from electrolyte before the battery is brought into use.

3. In an electric battery, a container forming both a main chamber free from electrolyte before the battery is brought into use but adapted to receive such electrolyte when the battery is in use, and an auxiliary chamber separate therefrom adapted to contain a dry component of the electrolyte, said auxiliary chamber having means permitting the filling of water thereinto, and means intermediate said chambers permitting the restricted passage of liquid from the auxiliary chamber into the main chamber.

4. An electric battery of the inert type provided in the upper part thereof with an auxiliary chamber for all of the dry component for the electrolyte, said chamber having in its upper wall a normally closed inlet for water, and a bottom sieve-like wall for said chamber of finely perforated material partitioning the auxiliary chamber off from the main interior of the battery, which latter is free from electrolyte before the battery is brought into use.

5. An electric battery of the inert type, comprising in combination a container constituting one electrode of the battery, a dolly comprising a second electrode in the container and extending above the top thereof, a sieve-like finely perforated partition wall in said container dividing the same into a lower chamber and an upper auxiliary chamber, which lower chamber is free from electrolyte before the battery is brought into use, absorbent material in the lower chamber surrounding the dolly, a dry component of the electrolyte in said auxiliary chamber and means in the top of the container constituting the top wall of said auxiliary chamber, for the purpose described.

6. An electric battery of the inert type, comprising a container constituting one electrode of the battery, a dolly comprising a second electrode in the container, a sieve-like partition wall in said container dividing the same into a lower chamber and an upper or auxiliary chamber, which lower chamber is free from electrolyte before the battery is brought into use, absorbent material in the lower chamber surrounding the dolly, a dry electrolyte in said auxiliary chamber, said dolly comprising a carbon rod projecting into said auxiliary container, and insulating means covering the interior surface of the zinc container and the surface of the carbon rod within said auxiliary chamber.

In testimony whereof I have signed my name to this specification in the presence of two subscribing witnesses.

CHARLES SAMUEL MUMMERY.

Witnesses:
F. S. JOHNSON,
A. MURPHY,